United States Patent
Yamaguchi et al.

[11] Patent Number: 5,975,933
[45] Date of Patent: Nov. 2, 1999

[54] CONNECTOR ATTACHMENT STRUCTURE

[75] Inventors: Noboru Yamaguchi; Yasuyoshi Serizawa; Haruyoshi Murofushi, all of Shizuoka, Japan

[73] Assignee: Yazaki Corporation, Tokyo, Japan

[21] Appl. No.: 08/897,035

[22] Filed: Jul. 18, 1997

[30] Foreign Application Priority Data

Jul. 22, 1996 [JP] Japan .................................. 8-192063

[51] Int. Cl.⁶ .................................................. H01R 13/64
[52] U.S. Cl. ............................................. 439/247; 439/34
[58] Field of Search .............................. 439/34, 247, 248, 439/249

[56] References Cited

U.S. PATENT DOCUMENTS

| | | | |
|---|---|---|---|
| 4,954,094 | 9/1990 | Humphrey | 439/247 |
| 5,228,865 | 7/1993 | Douty et al. | 439/247 |
| 5,252,087 | 10/1993 | Spinnato et al. | 439/247 |
| 5,261,828 | 11/1993 | Kandybowski | 439/79 |

FOREIGN PATENT DOCUMENTS

| | | | |
|---|---|---|---|
| 2329764 | 2/1974 | Germany | 439/247 |
| 61-32730 | 2/1986 | Japan . | |
| 5-39124 | 5/1993 | Japan . | |

*Primary Examiner*—Khiem Nguyen
*Attorney, Agent, or Firm*—Armstrong, Westerman, Hattori, McLeland & Naughton

[57] ABSTRACT

A connector attachment structure to prevent a damage on electric wires caused by bending thereof. A connector with electric wires is rotatably supported by a connector support. The support has support holes with or without a notch for receiving a pivotal pin. The connector support is provided either in an instrument panel or on an electrical junction box. The electric wires may extend by way of the electrical junction box to the connector. The electric wires from the connector are arranged in a direction of connector rotational axis. Another structure has a cover, being rotatably supported by a cover support, at a terminal portion of electric wires. The cover has a connector engagement portion and a tubular portion, which extends orthogonally from the engagement portion for leading the electric wires and is rotatably supported by the cover support and further extends in a direction of connector rotational axis. The cover support includes of a pair of flexible bent members formed annularly.

12 Claims, 11 Drawing Sheets

FIG. 1

See FIG. 1A

CONNECTOR ATTACHMENT STRUCTURE

BACKGROUND OF THE INVENTION

1. Field of the Invention

The present invention relates to a connector attachment structure free from excessive bending or tension applied to electric wires, by rendering a connector rotatable upon a connector engagement between a wiring harness on a vehicle door side and a wiring harness on a vehicle body side or upon a connector engagement between an electrical junction box and an external wire harness.

2. Description of the Prior Art

Figure 11:
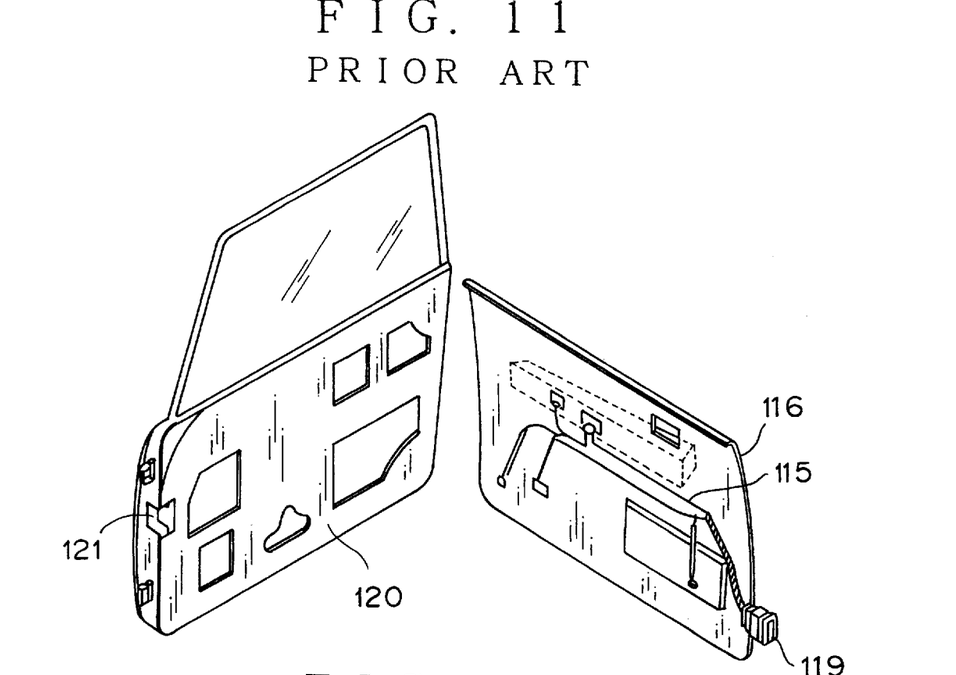
FIG. 11 is an exploded perspective view showing a prior art connector attachment structure.
Figure 12:
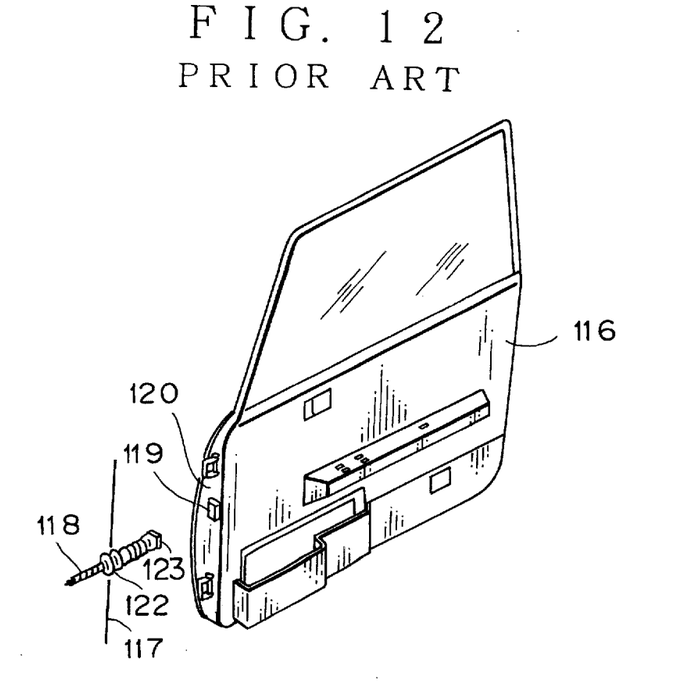
FIG. 12 is an exploded perspective view of the prior art connector attachment structure, showing a connection with a vehicle body side.

FIGS. 11 and 12 show a conventional connector attachment structure with wiring harnesses for vehicle door (Japanese Utility Model Application Laid-open No. 61-32730).

Referring to FIG. 11, a wiring harness (electric wires) 115 is fixedly arranged on a back surface of a door trim 116, and protruding from the front end of the door trim 116 is a connector 119 with a wiring harness (electric wires) 118 (FIG. 12) on a vehicle body 117 side. The connector 119 is incorporated in a recess 121 at a front end of a door panel 120.

The connector 119 is fixed to the front end of the door, with the door trim 116 being mounted on the door panel 120 as shown in FIG. 12. The wiring harness 118 on the vehicle body 117 side is firmly fixed to the vehicle body 117 by way of a waterproof rubber grommet 122, and a connector 123 at the extremity is engaged with the door side connector 119.

In the above conventional structure, however, the vehicle body side wiring harness 118 was apt to be damaged due to reiterative bending actions in a limited range within the grommet 122, attendant on opening and closing of the door.

Figure 13:
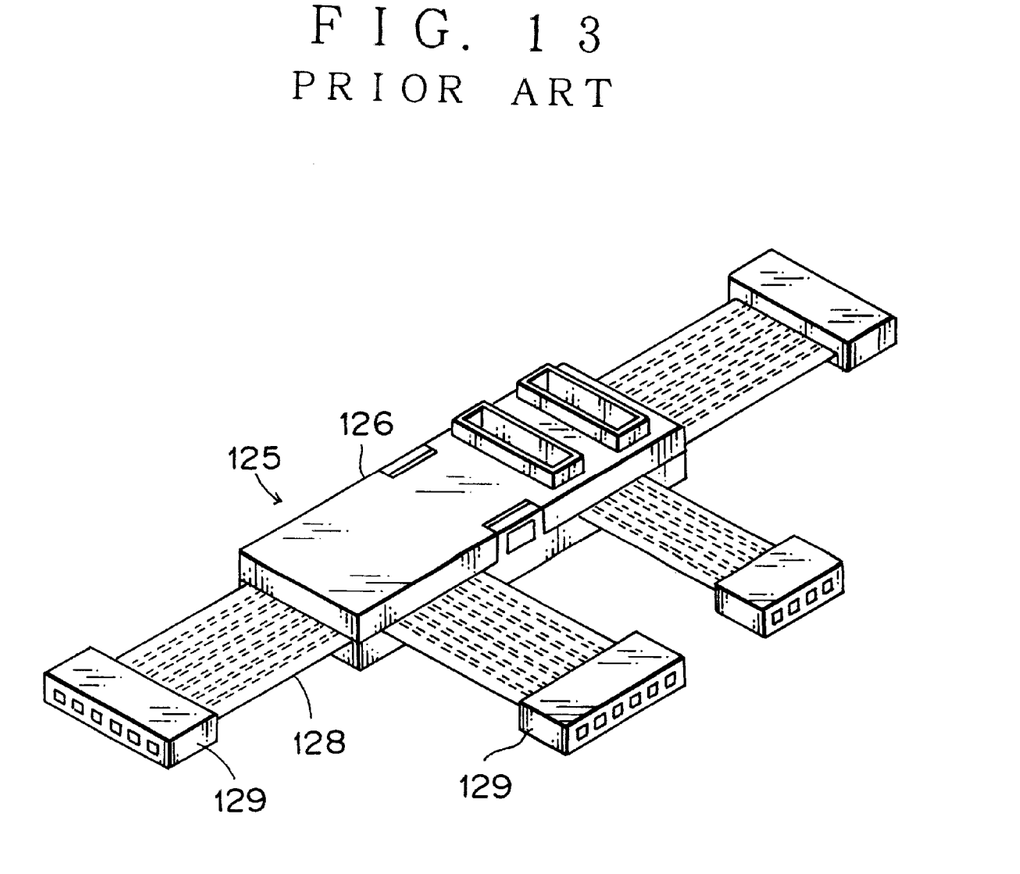
FIG. 13 is a perspective view showing another prior art connector attachment structure.

On the other hand, a connector attachment structure of a conventional electrical junction box 125 is shown in FIG. 13 (Japanese Utility Model Application Laid-open No. 5-39124).

A junction box body 126 made of a synthetic resin accommodates a busbar circuit (not shown) to which a flexible flat cable (electric wires) 128 extending to the exterior of the junction box body 126 is connected. The extremity of the flat cable 128 is provided with a connector 129 which is engaged with a connector (not shown) of an external wire harness. The flat cable 128 may be substituted by a plurality of covered electric wires. The electrical junction box 125 is fixed to an interior of a vehicle.

In the above conventional structure, however, the flat cable 128 connected to the electrical junction box 125 was apt to be bent and damaged at root thereof in case the connector 129 suffered reiterative forces such as tensile force from the external wire harness after a coupling of the external wiring harness to the connector 129, or in case a connector engagement work was forcibly made in spite of a wiring harness being too short.

SUMMARY OF THE INVENTION

It is an object of the present invention to provide a connector attachment structure free from a damage on electric wires by a bent thereof caused by opening and closing a vehicle door or by tension from a wire harness.

In order to achieve the above objective, as a first aspect of the present invention, a connector attachment structure, for engaging a connector connected to electric wires with another connector connected to other electric wires, has a connector support for rotatably supporting the connector on one side.

The connector may have pivotal pins, and the connector support may have support holes with which the pivotal pins are engaged and notches communicating with the support hole for receiving the pivotal pin. The connector support may be arranged within an instrument panel. The connector support may also be arranged within an electrical junction box. The electric wires may extend from a electrical junction box to a connector with a connector support. Electric wires may extend in a direction of connector rotational axis from the connector.

Further, as a second aspect of the present invention, a connector attachment structure, for engaging a connector connected to electric wires with another connector connected to other electric wires, has a cover arranged at a terminal portion over the connector on one side and the cover is rotatably supported by a cover support. The cover may have a connector engagement portion and a tubular portion, which extends orthogonally from the engagement portion for leading out electric wires and is rotatably supported by the cover support and further extends in a direction of connector rotational axis. Further, the cover support may consist of a pair of flexible bent member formed annularly.

BRIEF DESCRIPTION OF THE DRAWINGS

The present invention will be described in further detail with reference to the accompanying drawings, in which.

DETAILED DESCRIPTION OF THE PREFERRED EMBODIMENTS

Embodiments of the present invention will now be described in greater detail with reference to the accompanying drawings.

Figure 1:
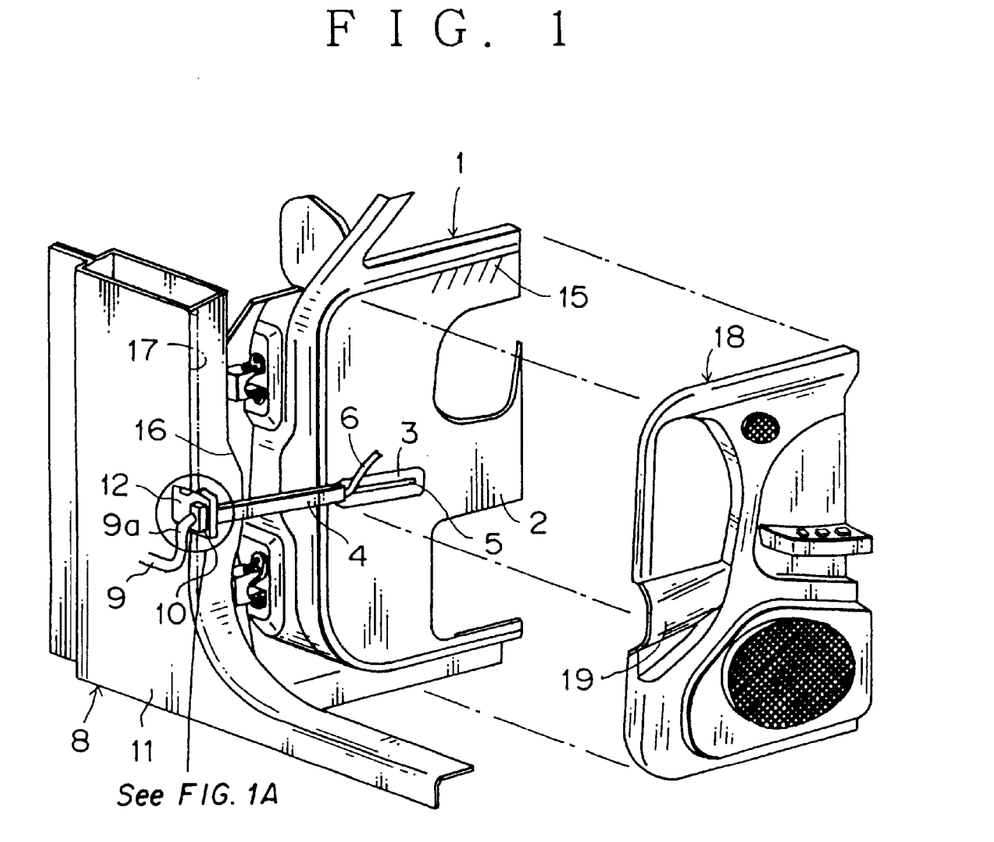
FIG. 1 is an exploded perspective view showing an embodiment of a connector attachment structure in accordance with the present invention.
Figure 1A:
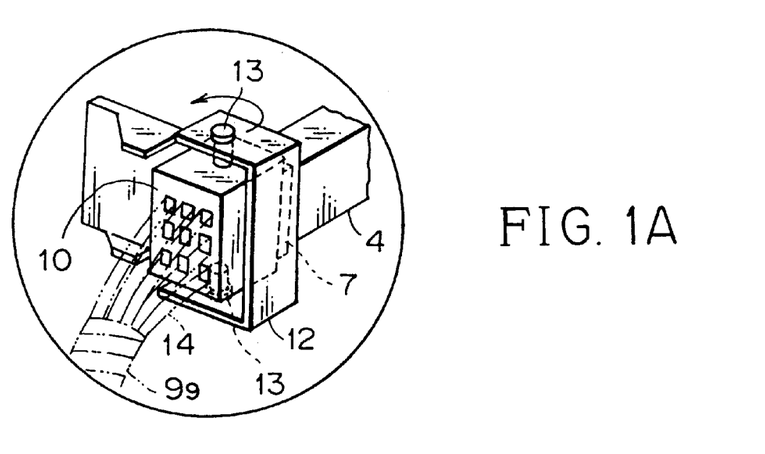

FIG. 1 shows an embodiment of a connector attachment structure applied to a door harness of a vehicle.

A door panel 2 of a vehicle door 1 is provided with a horizontally fixed slide guide 3 which sidably engages with a protector 4 made of a synthetic resin. For example, the protector 4 has at rear end thereof a protrusion (not shown) which slidably engages with a longitudinal guide hole 5 of the slide guide 3.

A wiring harness (electric wires) 6 passes through the interior of the protector 4 in a shape of a tube with a substantially rectangular section, and a connector 7 is fixedly provided at the extremity of the protector 4. The connector 7 is fittingly engaged with a connector 10 with a wiring harness (electric wires) 9 on a vehicle body 8 side.

The present invention provides the connector 10 on the vehicle body so as to be rotatable with rocking motion of the protector 4 upon opening and closing the door 1. More specifically, a metallic bracket 12 serving as a connector support fixedly provided on an inner wall 11 of the vehicle body 8, and the connector 10 is rotatably supported by upper and lower pivotal pins 13.

The pivotal pins 13 are provided on the connector 10 or on the bracket 12. Alternatively, a single bolt through the bracket 12 and the connector 10 would be applicable. The connector 7 at protector side couples to the connector 10 through the bracket 12.

In this embodiment, the wiring harness 9 connected to the connector 10 on the vehicle body extends vertically downward and turns to the horizontal direction. The wiring harness 9 has a somewhat elongated vertical portion 9a. The vertical portion 9a of the wiring harness 9 will twist corresponding to a rotational movement of the connector 10 at opening/closing operation of the door so as to prevent the electric wires from being bent and damaged. The vertical portion 9a may be directed upward in lieu of downward from the connector 10.

Referring to FIG. 1, the door side wire harness (electric wires) 6 is installed along the door panel 2. The protector 4 is formed into a tube with a substantially rectangular section. The slide guide 3 is fixed to the door panel 2 with a waterproof sheet 15. In order to secure effect of water proofing, the protector 4 and the connector 7 are located in a cabin more inner than weather strips 16 and 17 when the door is closed. A protector accommodating portion 19 is inflatedly formed on a door trim 18 joined to the door panel 2.

Figure 2:
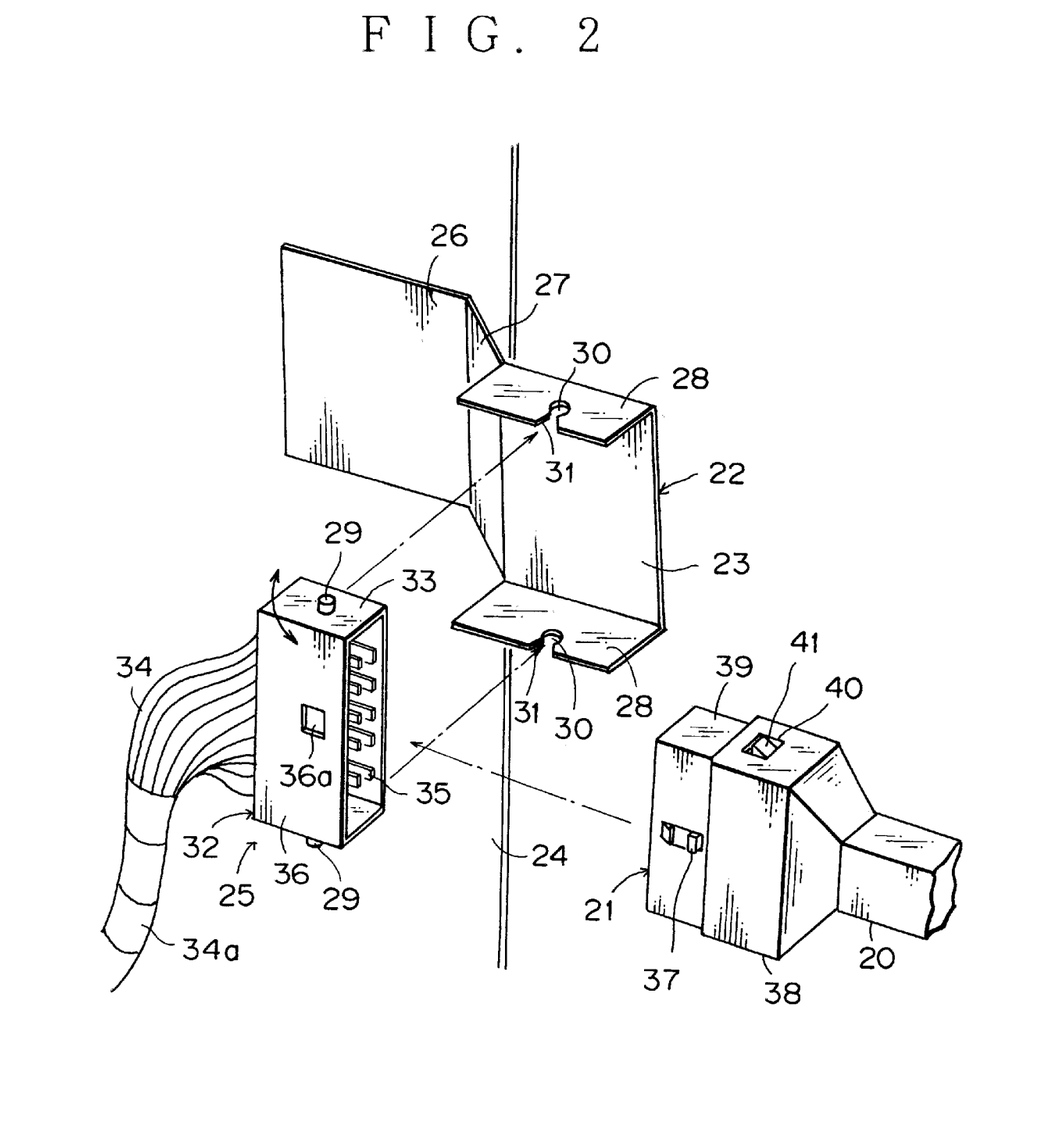
FIG. 2 is an exploded perspective view showing a second embodiment of the connector attachment structure.

FIG. 2 shows a second embodiment of the connector attachment structure in accordance with the present invention.

Though this structure is basically the same as the structure of FIG. 1, a connector 21 on a side of a protector 20 connects from a lateral side of a bracket 22 with a connector 25 on a vehicle body 24 without passing through the bracket 22 serving as a connector support.

The bracket 22 is formed by bending a metal plate and has a fixed portion 26 to be fixed to the vehicle body 24, a slant portion 27 projecting aslant from the fixed portion 26, and a pair of protruding portions 28 protruding from the upper and lower ends of the slant portion 27.

The pair of protruding portions 28 each has substantially in the middle thereof a support hole 30 for a pivotal pin 29 of the connector 25. Each protruding portion 28 further includes a tapered notch 31 extending toward its extremity from the support hole 30 communicating with the notch 31 so as to allow the pivotal pin 29 to be engaged with the support hole through the notch 31 with one pushing action. The notch 31 has a minimum width slightly narrower than the outer diameter of the pivotal pin 29 to prevent the pivotal pin 29 from coming off the support hole 30.

Top and bottom walls 33 of a connector housing 32 each have the pivotal pin 29 which is in the shape of a shortened cylinder and is projectingly formed integrally on respective external surfaces at substantially the center thereof. The connector housing 32 accommodates a plurality of male terminals 35 connected to a wiring harness 34 (electric wires). Similar to the first embodiment, the wiring harness 34 includes a vertical portion 34a which extends vertically downward from the connector 25 for allowing a twist thereof. Side walls 36 of the connector housing 32 are each provided with an engagement hole 36a for a flexible lock arm 37 of the door side connector 21.

The rear half of the door side connector 21 is fitted in a locked manner into an enlarged connector engagement portion 38 integrally formed at the extremity of the protector 20, with the front half of the connector projecting from the connector engagement portion 38. A housing external wall 39 of the connector 21 is provided with a locking protuberance 41 which mates with an engagement hole 40 of the connector engagement portion 38 and with which the connector 21 is locked in the protector 20.

Figure 3:
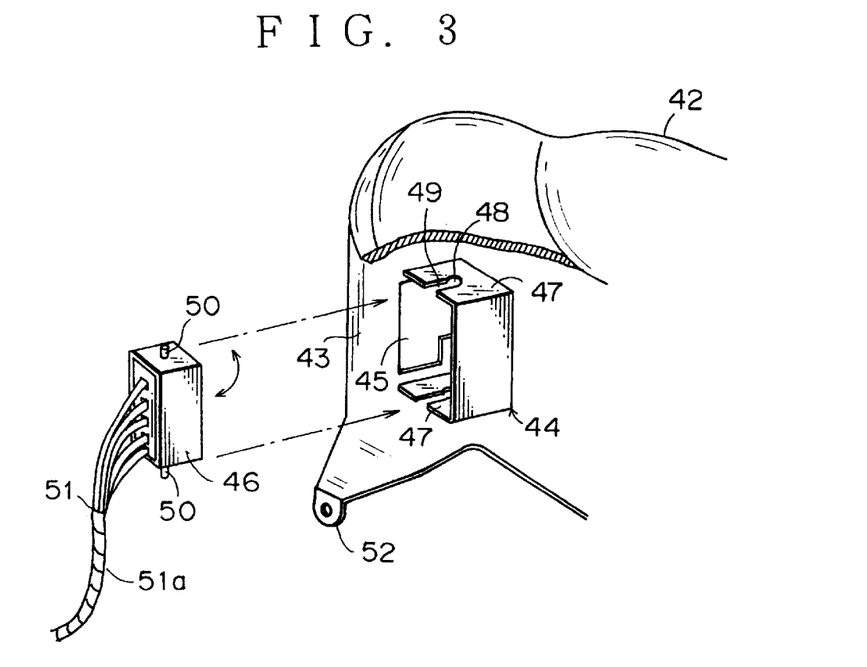
FIG. 3 is an exploded perspective view (viewed from a direction of an arrow Y of FIG. 4) showing a third embodiment of the connector attachment structure.
Figure 4:
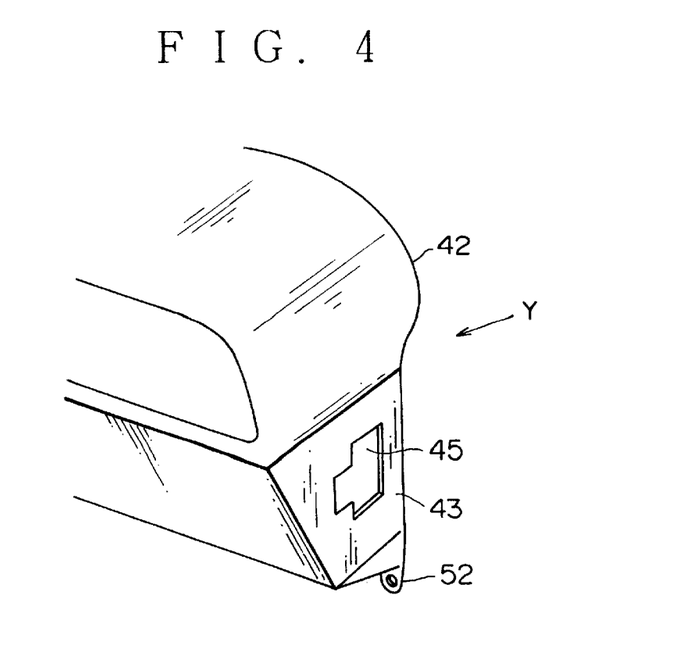
FIG. 4 is a perspective view of an instrument panel.

FIGS. 3 and 4 show a third embodiment of the connector attachment structure.

This structure includes a bracket 44 serving as a connector support and provided on an inside of a side wall 43 of an instrument panel 42 adjacent to the inner wall 11 of the vehicle body 8 (FIG. 1) and a door side connector is led through an opening 45 provided on side wall 43 and engaged with a vehicle body side connector 46.

The bracket 44 is substantially U-shaped and includes top and bottom walls 47 each having support hole 48 and a notch 49 for the connector 46 in the same manner as the second embodiment. The notch 49 extends in substantially parallel with the side wall 43 of the instrument panel 42 so as to allow the connector 46 to be accommodated within the bracket 44 along the side wall 43. The bracket 44 may be resin-molded integrally with the instrument panel 42 or may be made separately of a metal for fixing to the instrument panel 42.

The vehicle body side connector 46 is provided with a pair of pivotal pins 50 each to be engaged with support hole 48 in the same manner as the second embodiment. A wiring harness 51 following the connector 46 has a vertical portion 51a for twisting. The opening 45 of the instrument panel 42 is positioned orthogonally to a direction in which the connector 46 is inserted into the bracket 44. The connector 46 is engaged with the door side connector (not shown) preferably in a direction facing with the opening 45.

According to this embodiment, a dead space within the instrument panel 42 can be utilized to place the connector support 44. Further, the vehicle body side connector 46 can be accommodated within the instrument panel 42 and is not exposed to the exterior, which will contribute to a good appearance and to a protection of the connector 46 at the time of opening the door.

Figure 5:
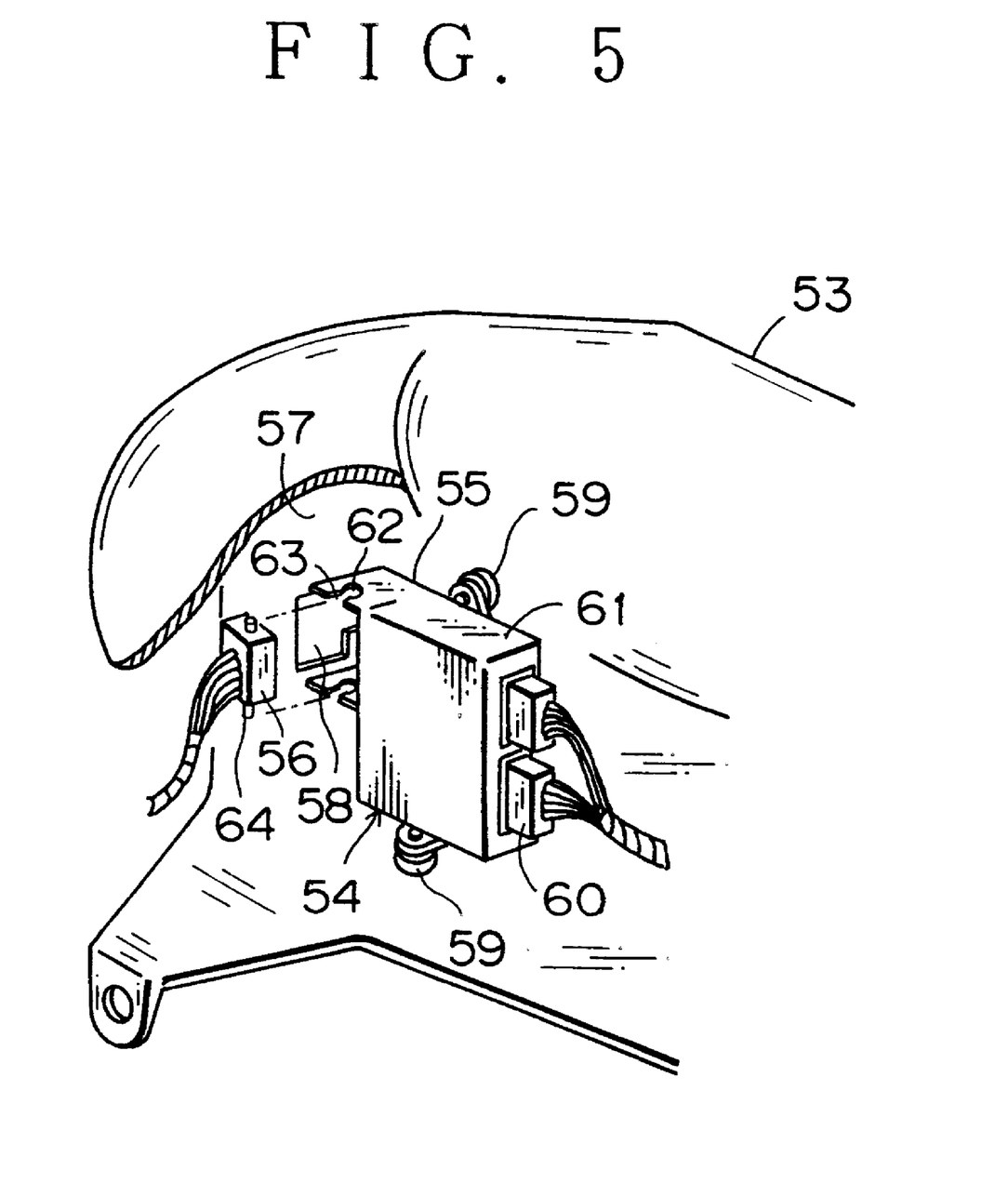
FIG. 5 is a perspective view showing a fourth embodiment of the connector attachment structure.

FIG. 5 shows a fourth embodiment of the connector attachment structure.

In this structure, a bracket 55 serving as a connector support is integrally provided on an electrical junction box 54 within an instrument panel 53, and a vehicle body side connector 56 is rotatably supported by the bracket 55.

A side wall 57 of the instrument panel 53 is provided with an opening 58 for an insertion of a door side connector in the same manner as the third embodiment. The electric junction box 54 is screwed at two fixed portions 59 to the instrument panel 53. A plurality of connectors 60 are connected to the electric junction box 54, and the vehicle body side connector 56 would serve as an external connector to the electric junction box 54. A pair of upper and lower brackets 55 are projectingly formed integrally with a junction box body 61 made of a synthetic resin. The brackets 55 may be made separately of a metal and thereafter fixed to the junction box body 61. In the same manner as the preceding embodiments, each bracket 55 has a pair of support holes 62 and notches 63, and the connector 56 projectingly has a pair of pivotal pins 64.

According to this embodiment, the electric junction box 54 is mounted on the instrument panel 53 in order to arrange the bracket 55 within the instrument panel 53 so as to eliminate a fixing work of the bracket 55 to the instrument panel 53.

Figure 6:
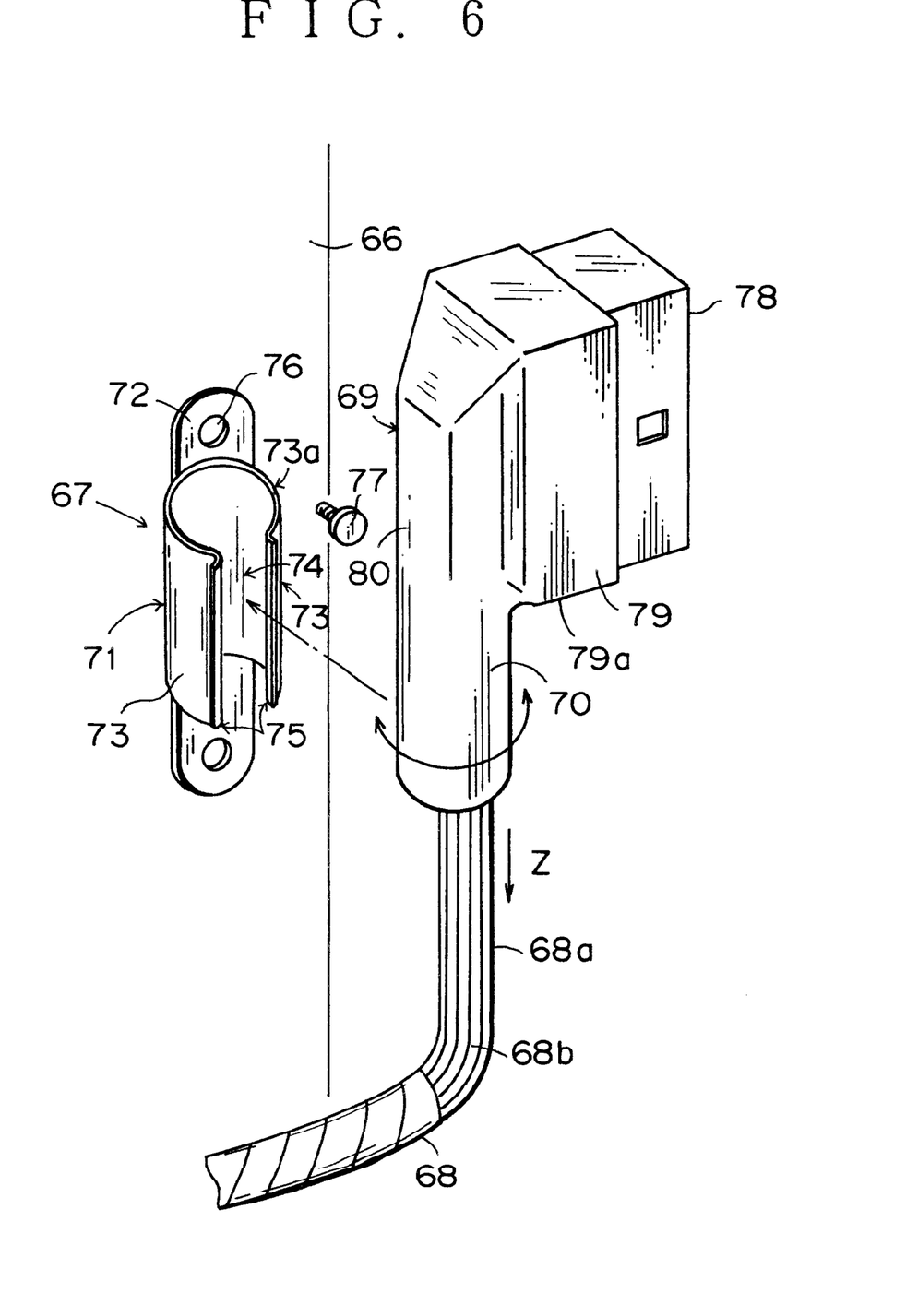
FIG. 6 is a perspective view showing a fifth embodiment of the connector attachment structure.

FIG. 6 shows a fifth embodiment of the connector attachment structure.

In this structure, a vehicle body 66 is provided with a substantially annular bracket (cover support) 67, while a vehicle body side wire harness (electric wires) 68 has at an extremity a cover 69 made of synthetic resin so as to rotatably support a tubular portion (in this embodiment, a cylindrical portion) 70 of the cover 69 by the bracket 67.

The bracket 67 is made of a metal or a synthetic resin and has an annular portion 71, for supporting the cover 69, and fixed portions 72 each on the upper and lower ends of the annular portion 71. The annular portion 71 has a pair, right and left, of arcuately curved flexible bent members 73 forming therebetween a gap 74 for receiving the bracket. The bent members 73 each have an outwardly curled end serving as a guide portion 75 for the cover 69 or a vertical portion 68a of the wiring harness 68. The fixed portions 72 each have a bolt hole 67 for receiving a machine screw 77 with which the bracket 67 is fixed to the vehicle body 66.

The cover 69 includes a connector engagement portion 79 which covers a rear half of a vehicle body side connector 78 and the tubular portion extending downward in a direction orthogonal to the connector engagement portion 79. The vertical portion 68a of the wiring harness 68 passes through the tubular portion 70.

The tubular portion 70 of the cover 69 is fitted through the gap 74 into the bracket 67 with one action, with the pair of bent members 73 being urged outwardly and being restored to initial positions simultaneously with an insertion of the tubular portion 70 and then retaining the tubular portion 70 without any play. Also, the vertical portion 68a of the wiring harness 68 may be inserted through the gap 74, followed by an insertion of the tubular portion 70 into the annular portion 71 from the top thereof. Alternatively, the tubular portion 70 may be formed partially of a cut-off flat portion (not shown) parallel to as axis of the connector engagement portion 79 so that the cover 69 can be inserted into the annular portion 71 through the gap 74 of the bracket 67 with a smaller force.

The tubular portion 70 of the cover 69 is thus rotatably supported within the bracket 67. A bottom end face 79a of the connector engagement portion 79 comes into contact with top end faces 73a of the bent members 73 so that the cover 69 is thereby supported without coming off. The tubular portion 70 may be provided on peripheral surface thereof with a groove (not shown) engaged with the bent members 73. With a rotation of the connector 78, the vertical portion 68a of the wiring harness 68 led through the tubular portion 70 can twist between the connector 78 and a bent portion 68b so as to absorb the rotation of the connector 78.

According to this embodiment, the connector 78 is located above the bracket 67 so that the bracket does not prevent rotation of the connector 78, which ensures a larger rotation angle. Also, the cover 69 being large-sized will facilitate a attachment work thereof into the bracket 67, and a spring effect of the bent members 73 will prevent the cover 69 from being disengaged upon rotation thereof. Further, the electric wires 68 are protected by the cover 69 and are forcibly directed downward (in a direction of rotational axis of the connector, that is, direction Z, so as to ensure the vertical portion 68a to be vertical and also to ensure a twisting motion upon rotation of the connector.

It would also be possible that the tubular portion 70 of the cover 69 extends upward. This structure would necessitate the groove engaged with the bent members 73 or any stopper (not shown) for preventing disengagement of the cover.

The structures of the above embodiments are effective not only in a case where the rigid protector 4 (FIG. 1) is applied but also in another case where the connector 7 of the door side wiring harness 6 is directly connected to the vehicle body side connector 10 without using the protector 4. And, it would also be possible to make the door side connector 7 rotatable in place of the vehicle body side connector according to the fifth embodiment.

Figure 7:
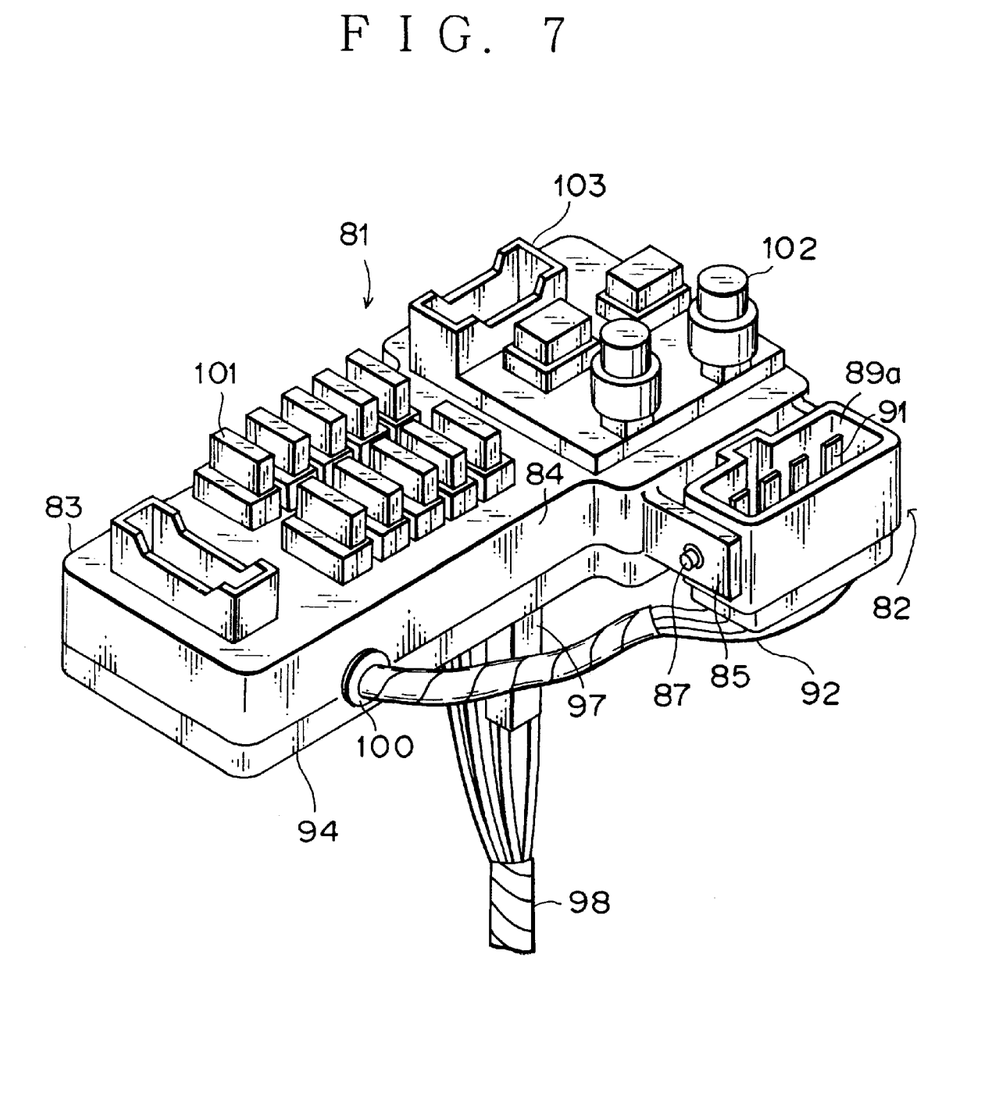
FIG. 7 is a perspective view showing a sixth embodiment of the connector attachment structure.
Figure 8:
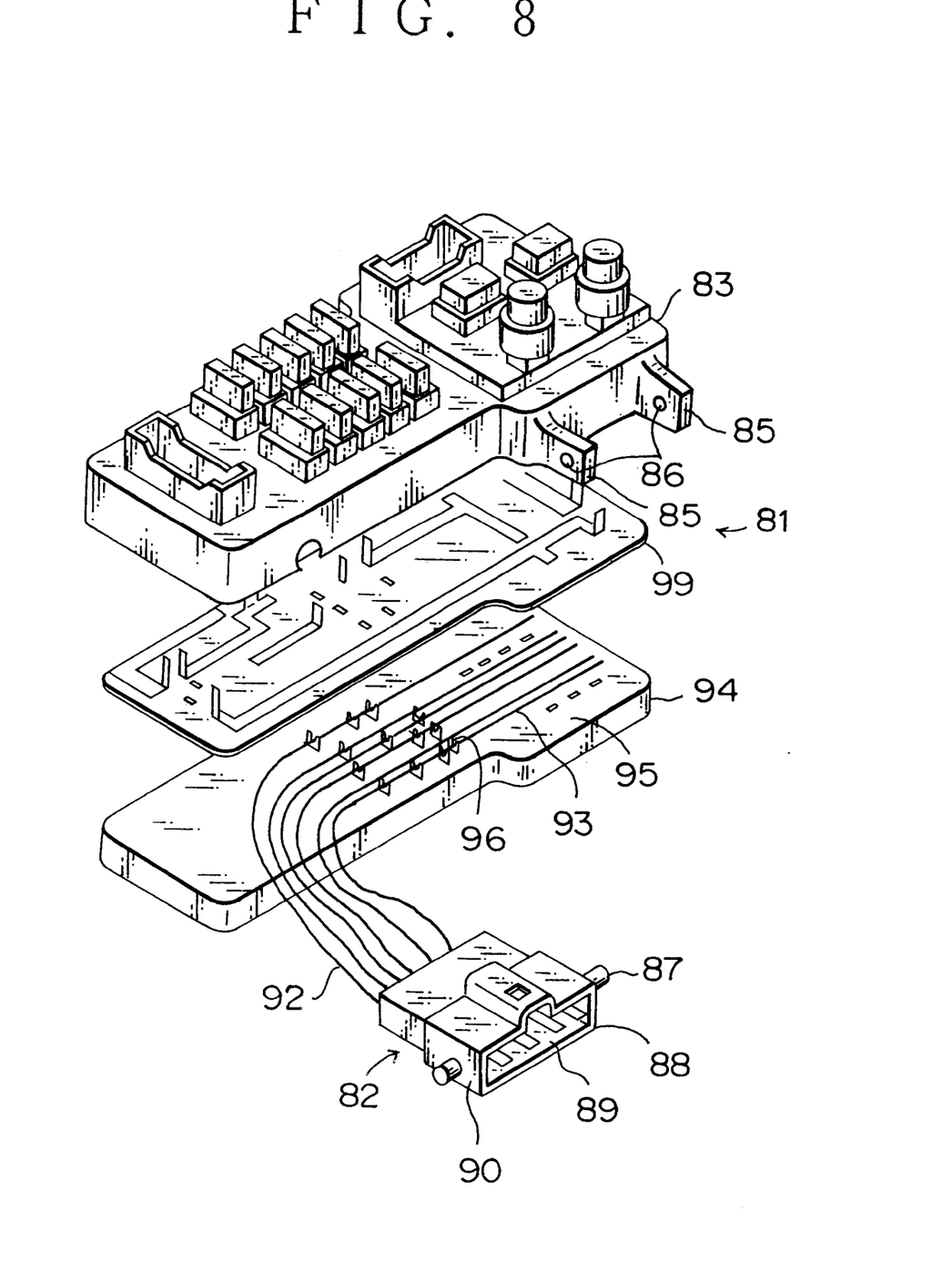
FIG. 8 is an exploded perspective view of FIG. 7.

FIGS. 7 and 8 show a sixth embodiment of the connector attachment structure in accordance with the present invention.

This structure serves to connect an electrical junction box 81 arranged in the interior of a vehicle with a wiring harness (electric wires having a connector) not shown. A connector (in this embodiment, a female connector) 82 on the electrical junction box is rotatably mounted on an external wall of a junction box body 83. More specifically, the junction box body 83 made of a synthetic resin has a pair of arm-like or plate-like brackets (connector supports) projecting perpendicularly from a side wall 84 thereof, and the pair of brackets 85 each have horizontal support hole 86 with which pivotal pins 87 of the connector 82 engage rotatably.

As shown in FIG. 8, the pivotal pins 87 are in a form of short cylinder formed integrally on side walls 90 of an engagement chamber 89 in a connector housing 88 made of a synthetic resin. The brackets 85 have a certain flexibility so as to allow the pivotal pins 87 to be engaged with the support holes 86 with the brackets being outwardly bent. Naturally, notches continuous with support holes may be provided as in the above embodiments. As an alternative, the pivotal pins 87 may be provided on the brackets 85.

In this embodiment, as shown in FIG. 7, a engagement chamber opening 89a of the connector 82 faces upward with respect to the electrical junction box 82, with a result that a counterpart connector is inserted into the engagement chamber 89 from above. Up on the insertion, the connector 82 is capable of rocking on the pivotal pins 87, thereby facilitating a connector engagement work.

Terminals 91 in the connector 82 are connected to a circuit 93 (FIG. 8) in the electrical junction box 81 by means of covered electric wires 92. The circuit 93 is arranged on a substrate 95 on a lower junction box body (a bottom cover) 94 and is connected by way of pressure welding terminals 96 to a connector 97 under the bottom cover 94. A wire harness 98 is connected to the connector 97 from below. A busbar circuit substrate 99 is laid on the substrate 95. In this embodiment, the brackets 85 are provided on the upper junction box body 83.

As shown in FIG. 7, electric wires 92 diverging from the circuit 93 are taken out through a hole (electric wire takeout portion) 100 of the junction box body 83 and are connected to the terminals 91 in the connector. The electric wire takeout portion is positioned in a direction of connector rotational axis with respect to the connector supports (brackets) 85, and the wires 92 extend with a slight slack in the direction of the connector rotational axis. This will allow the electric wires 92 to present a flexure absorbing effect upon rotation of the connector. On the junction box body 83, fuses 101, relays 102, or another female connectors 103 are arranged.

According to this embodiment, in spite of application of a tensile force upon or after connection of a connector (not shown) of an external wiring harness to the connector 82 on the electrical junction box 81, the connector 82 rotates to release an excessive force which would otherwise be applied to the connector 82, electric wires 92, or the electric wire leading-out portion 100, thereby preventing the elements 82, 92, and 100 from being damaged. It is also possible to arrange effectively and inexpensively the circuits (electric wires) 92 in the electrical junction box 81 without using any intermediate connectors. Further, the rocking motion of the connector 82 will ensure an easy and secure connector engagement work and would allow the work with one hand.

Figure 9:
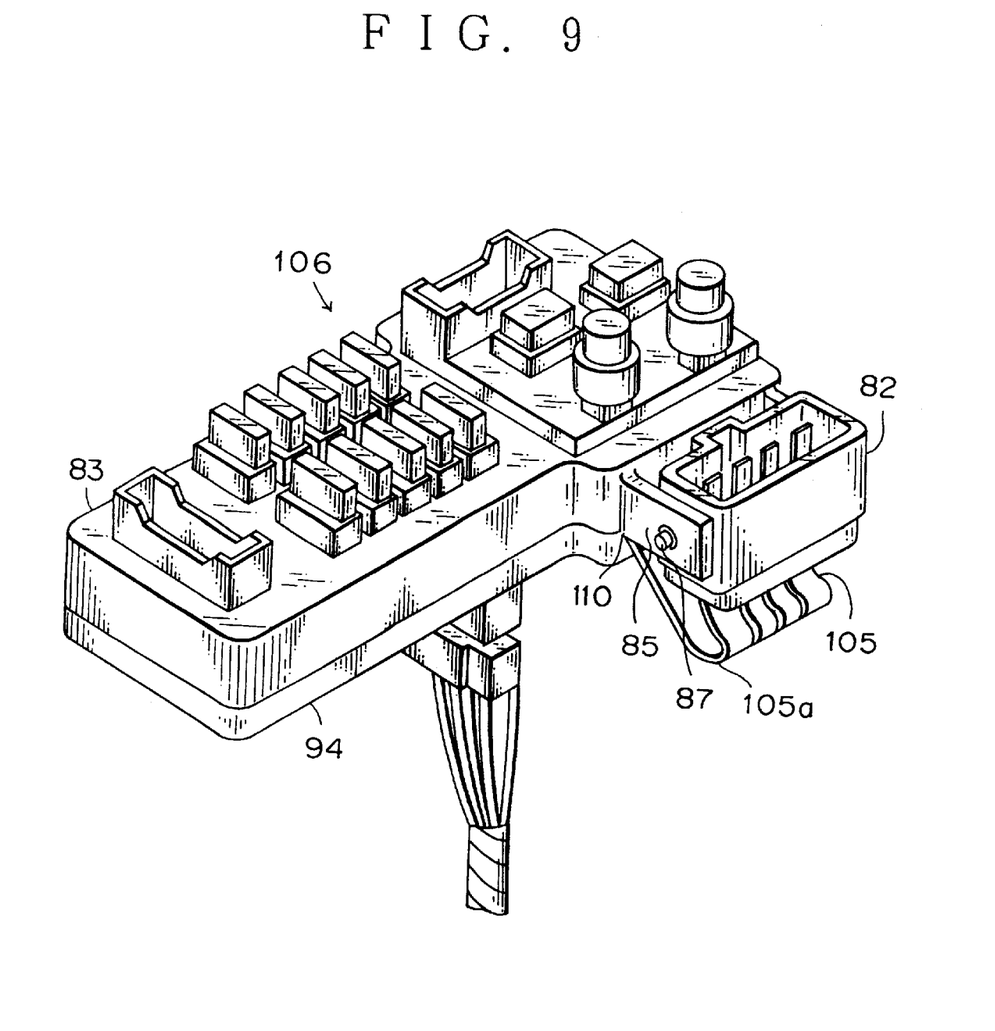
FIG. 9 is a perspective view showing an analogue of the connector attachment structure of FIG. 7.
Figure 10:
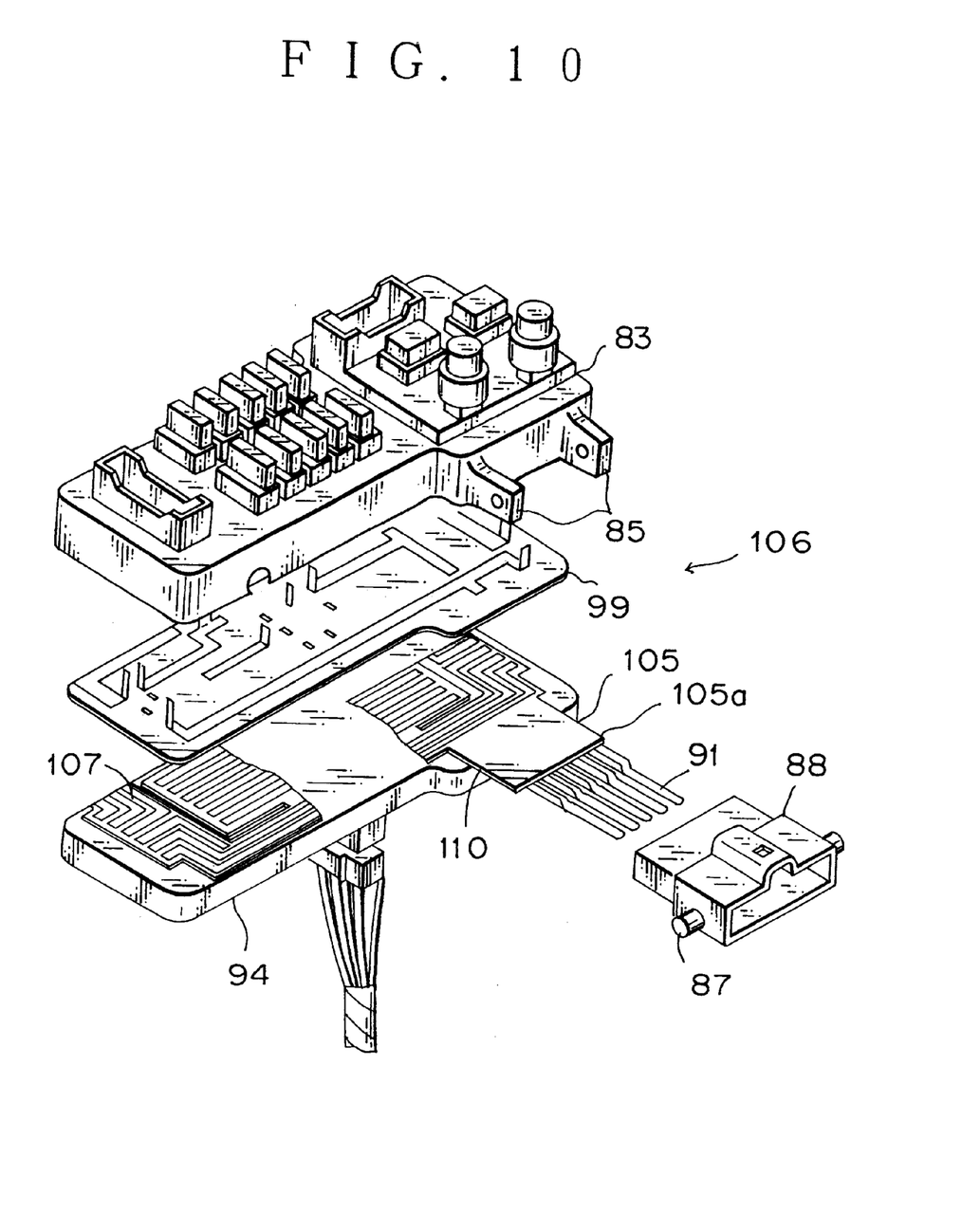
FIG. 10 is an exploded perspective view of FIG. 9.

FIGS. 9 and 10 show an analogue of the connector attachment structure set forth hereinabove.

This structure includes a flexible flat cable 105 as electric wires to be connected to the rotatable connector 82, in place of the covered electric wires 92. The flat cable (electric wires) 105 is led downward out of the connector 82 and then is bent into a electrical junction box 106. A bent portion 105a is flexed upon a rotation of the connector 82 so as to allow a smooth rotation of the connector 82.

As shown in FIG. 10, the flat cable 105, diverged from a printed circuit substrate 107 on a bottom cover 94, protrudes outward horizontally and has an terminal end portion 105a with terminals 91 accommodated in the connector housing 88. A leading-out portion 110 of the flat cable 105 is positioned slightly behind the connector 82. In the same manner as the preceding embodiment, the connector 82 is supported by the brackets 85 being engaged with the pivotal pins 87. The other elements are the same as the preceding embodiment, and hence the same reference numerals are applied and an explanation thereof is eliminated.

As described hereinabove, according to the first embodiment of the present invention, the connector, being rotatably supported, can smoothly follow the rocking motion of the wiring harness on the door side upon opening and closing the door and release tension of the electric wires being connected to such an electrical junction box so as to prevent an excessive force to the electric wires or to the connector, consequently, preventing a damage of the electric wires or of other components.

According to the second embodiment, the pivotal pins are inserted through the notches to thereby achieve a easy and secure one push engagement of the connector with the connector supports. According to the third embodiment, the dead space within the instrument panel can be utilized, with the connector being protected within the instrument panel from possible weather conditions upon opening and closing the door.

According to the fourth embodiment, the electrical junction box with the connector supports will eliminate the fixing work of the connector supports, thus contributing to a reduction in number of steps of work.

According to the fifth embodiment, the rocking motion of the cover releases the excessive force applied to the electric wires, and prevents any damage on the electric wires. The tubular portion of the cover is fitted into the brackets with one action retained without any play.

According to the sixth embodiment, the connector rotates upon connection of electric wires to the electrical junction box, to thereby release the excessive force such as tensile force occurred on the electric wires, as well as to ensure an easy and secure engagement work of the connector in spite of short electric wires being connected.

According to the above embodiments, with the rotation of the connectors, the electric wires can twist to absorb a flexure in the circumferential direction, which eliminates a bending of the electric wires conventionally arisen and prevents any damage on the electric wires.

What is claimed is:

1. A connector attachment structure comprising:
   a first connector connected to electric wires;
   another connector connected to other electric wires and coupled with said first connector;
   pivotal pins provided on said first connector; and
   a connector support, provided with support holes to engage said pivotal pins, to support said first connector, whereby said first connector is rotatably supported by said connector support,
   wherein said support holes each have a notch to receive said pivotal pin or said connector support consists of a pair of resilient plate-like pieces so as to easily engage said pivotal pins with said support hole.

2. The connector attachment structure according to claim 1, wherein said connector support is arranged within an instrument panel.

3. The connector attachment structure according to claim 1, wherein said connector support is arranged on an electrical junction box.

4. The connector attachment structure according to claim 2, wherein said connector support is arranged on an electrical junction box.

5. A connector attachment structure according to claim 3, wherein electric wires connected to said first connector extend by way of said electrical junction box.

6. The connector attachment structure according to any one of claims 1, 2, 3, 4 or 5, wherein said electric wires extend in a direction of connector rotational axis from said connector supported rotatably.

7. The connector attachment structure according to claim 1, further comprising a cover arranged at a terminal portion over one of said connectors,
   said cover being rotatably supported by a cover support.

8. The connector attachment structure according to claim 7, wherein said cover has a connector engagement portion and a tubular portion extending orthogonally therefrom for leading electric wires,
   said tubular portion being rotatably engaged with said cover support and extending in a direction of connector rotational axis.

9. The connector attachment structure according to claim 8 wherein said electric wires extend in a direction of a cover rotational axis from said cover.

10. A connector attachment structure comprising:
    means for engaging a connector connected to electric wires with another connector connected to other electric wires,
    whereby one of said connectors is rotatably supported by a connector support;
    a cover arranged at a terminal portion over one of said connectors, which cover is rotatably supported by a cover support including a pair of annular flexible bent members;

said cover having a connector engagement portion and a tubular portion extending orthogonally therefrom for leading electric wires, and said tubular portion is rotatably engaged with said cover support and extends in a direction of a connector rotational axis.

11. The connector attachment structure according to claim 10, wherein said electric wires extend in a direction of a cover rotational axis from said cover.

12. A connector attachment structure comprising:

a first connector connected to electric wires;

another connector connected to other wires, fixed to a hard protector of an electric wire, and coupled with said first connector;

pivotal pins provided on said first connector; and a connector support, provided with support holes to engage said pivotal pins, to support said first connector, whereby said first connector is rotatably supported by said connector support so that said first and another connector in a coupled state are capable of rotatably moving.

* * * * *